United States Patent [19]

Zellman

[11] Patent Number: 5,315,224

[45] Date of Patent: May 24, 1994

[54] METHOD AND AN ARRANGEMENT FOR STARTING AN ELECTRICAL MACHINE HAVING VARYING RELUCTANCE

[75] Inventor: Per Zellman, Stockholm, Sweden

[73] Assignee: Emotron Aktiebolag, Helsingborg, Sweden

[21] Appl. No.: 866,175

[22] PCT Filed: Dec. 27, 1990

[86] PCT No.: PCT/SE90/00875
§ 371 Date: Jul. 23, 1992
§ 102(e) Date: Jul. 23, 1992

[87] PCT Pub. No.: WO91/10281
PCT Pub. Date: Jul. 11, 1991

[30] Foreign Application Priority Data

Dec. 27, 1989 [SE] Sweden ............... 8904370-7
Jun. 21, 1990 [SE] Sweden ............... 9002217-9

[51] Int. Cl.⁵ .................................................. H02P 8/00
[52] U.S. Cl. ..................................... 318/701; 318/254; 318/721
[58] Field of Search ............... 318/254, 439, 701, 799, 318/138, 721, 805, 809

[56] References Cited

U.S. PATENT DOCUMENTS

| | | | |
|---|---|---|---|
| 4,520,302 | 5/1985 | Hill et al. . | |
| 4,868,478 | 9/1989 | Hedlund et al. . | |
| 4,959,596 | 9/1990 | MacMinn et al. | 318/254 |
| 5,012,172 | 4/1991 | Sember | 318/701 |
| 5,051,680 | 9/1991 | Belanger . | |
| 5,107,195 | 4/1992 | Lyons et al. | 318/701 |
| 5,173,651 | 12/1992 | Buckley et al. | 318/701 |
| 5,196,775 | 3/1993 | Harris et al. | 318/799 |

FOREIGN PATENT DOCUMENTS 0251785 1/1988 European Pat. Off. .

Primary Examiner—William M. Shoop, Jr.
Assistant Examiner—John W. Cabeca
Attorney, Agent, or Firm—Young & Thompson

[57] ABSTRACT

An electric variable reluctance machine having at least three phase circuits with varying reluctance depending on the position of a movable part, made of soft magnetic material, in relation to a stationary part. The phase circuit values having a clear relationship with the reluctance values of the machine are detected and used to select which of the phase circuits are to be activated in order to provide torque in a desired direction. The selected phases are activated in sequence by control pulses from a control unit.

9 Claims, 3 Drawing Sheets

T = TORQUE
L = INDUCTANCE

METHOD AND AN ARRANGEMENT FOR STARTING AN ELECTRICAL MACHINE HAVING VARYING RELUCTANCE

The present invention relates to a method for starting an electrical machine having varying reluctance and being of the kind set forth in the preamble of claim 1, and also to an arrangement for carrying out the method. Examples of machines of this kind are stepping motors and so-called switched reluctance motors (SR-motors).

BACKGROUND ART

Machines having varying reluctance, hereinafter called reluctance machines, may be rotating or linear machines, meaning that when a movable part rotates or moves linearly, the reluctance in the magnetic circuit of the machine will vary. In the following, this movable part is called the rotor, irrespective of the type of machine concerned. The position of this movable part is thus called the rotor position.

Normally, in order to utilize a reluctance machine optimally, the position of the movable part, i.e. the rotor position, is sensed and the machine is controlled on the basis of this sensed position. The position is often sensed with the aid of position sensors mounted on the machine, these sensors producing an output signal which denotes the absolute position. Sensors of a simpler kind which provide relative positional information, for instance increment sensors, are also used.

In recent times, methods have been proposed for controlling reluctance machines which do not include the use of physical sensors. Two such methods are described in U.S. Pat. No. 4,868,478 and S.E. 8604307-2. All of the embodiments described in these publications use different methods of sensing or measuring the inductance in a machine phase.

However, one problem which is not resolved satisfactorily by the methods described in these publications, is how the machine shall be started.

Since the inductance is indirectly a measure of the reluctance, the drive circuits described in said publications constitute examples of embodiments which can be used in practice as the basis of starting a reluctance machine. These drive circuits are not described in detail here. The invention, however, is not restricted to its use together with these drive circuits, but applies to all systems in which the reluctance or a magnitude connected thereto can be measured or sensed in the various magnetic circuits of the machine.

Machines of the kind to which the invention relates include a stationary part, here referred to as the stator, irrespective of whether the machine concerned is a rotating machine or a linear machine, and a movable part, the rotor. Both the stator and the rotor are normally made from a soft magnetic material, such is soft magnetic iron, with embossed, toothlike poles.

Flux generating windings for the different phases and poles are normally applied to the stator, which gives favourable operation with respect to mechanical construction, operational reliability, working temperature, etc., although these windings may alternatively be mounted on the rotor instead, if so desired. In the case of specific machine designs, there is used a combination of varying reluctance and permanent magnets. An example of one such design is the socalled hybrid-stepping motor.

A common feature of machines which employ varying reluctance is that these machines shall be controlled so that current will flow through the machine windings only when the reluctance for each individual winding circuit either increases with a change in rotor position, which applies to generator operation, or decreases with a change in the rotor position, which applies to motor operation. The aforesaid rotor-position-dependency derives from this.

For the sake of simplicity, the following description will be made solely with reference to rotating machines. It will be understood, however, that what is described applies also to linear machines.

The object of the invention is to provide a method for engaging and starting a machine having varying reluctance, with the intention of establishing which phase circuit or phase circuits shall be activated in order to obtain torque in a desired direction.

The aforesaid object is achieved with a method having the characteristic features set forth in claim 1. Further developments of the invention and other features thereof, and an arrangement for carrying out the method are set forth in the remaining claims.

According to the invention, the reluctance in the magnetic circuits of the machine is sensed, thereby obtaining information as to the absolute position of the rotor within a reluctance cycle. By sensing and processing this information in accordance with the inventive method, it is possible always to select the correct phase circuit, so as to obtain maximum torque in a desired direction. The method is based on the fact that the reluctance cycle can be divided into a given number of zones, where each zone has a unique relationship between the respective reluctance values of the different phases. For the purpose of determining in which of these zones the rotor is positioned, the measured values are mutually compared so to determine the order of magnitude of these values.

Although the inventive method is primarily suited for machines of the aforesaid kind which are not provided with physical rotor position sensors, the method can also be applied to machines in which rotor position sensors having limited function are used.

The invention presumes that the reluctance or a magnitude coupled thereto, e.g. the inductance, in the various magnetic circuits of the machine is measured or sensed. This measuring or sensing of said reluctance value is effected in such a way that information relating to rotor position is obtained, such that activation of the machine can be effected in a reliable manner on the basis of this information. The desired operational state of the machine is achieved in this way, e.g. the maximum torque in the desired drive direction for instance when the machine is a drive motor.

BRIEF DESCRIPTION OF THE DRAWINGS

The invention will now be described in more detail with reference to the accompany drawings, in which.

DETAILED DESCRIPTION OF THE DRAWINGS

Figure 1:
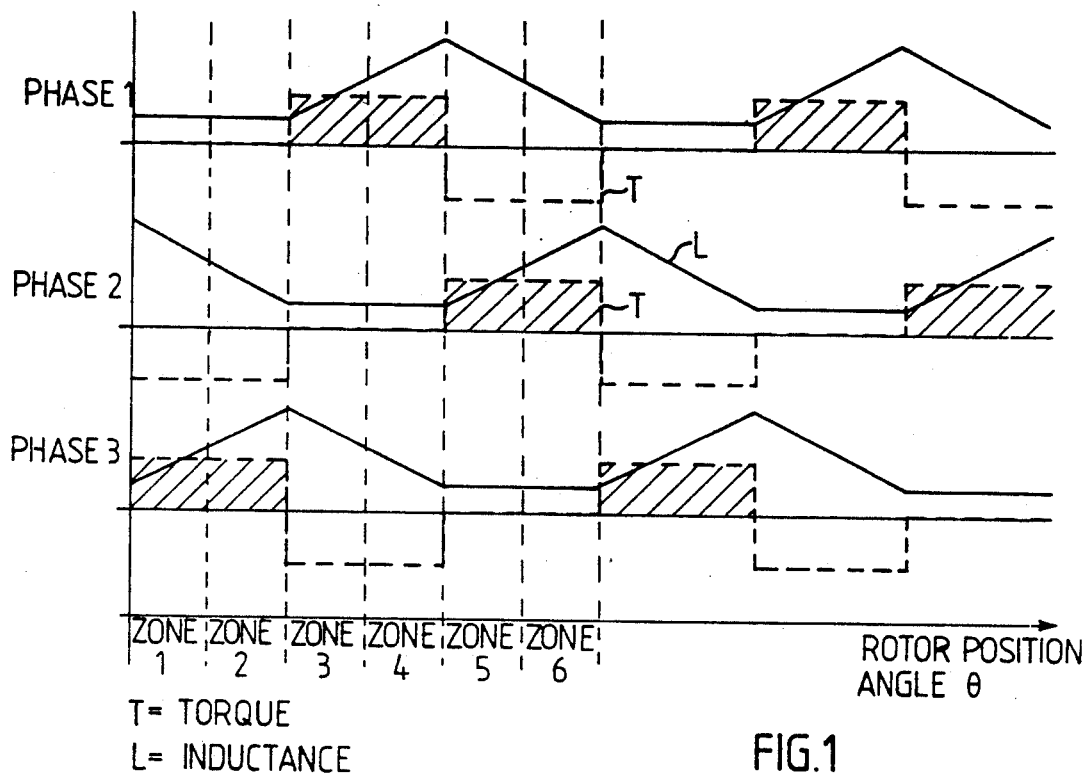
FIG. 1 illustrates schematically a diagram of inductance and static torque as a function of the rotor position of a reluctance motor having three separate phases, each with an individual winding circuit.

FIG. 1 illustrates schematically curve forms for static torque T in broken lines and for inductance L in full lines for a 3-phase reluctance machine which has a reluctance cycle that can be divided into six zones, zone 1–zone 6. The curves for the three phases, Phase 1, Phase 2 and Phase 3 are shown separately in three separate diagrams, one beneath the other. It will be seen from the Figure that the zone boundaries or limits are defined by the positions in which two phases have equally large inductance values. The inductance is inversely proportional to the reluctance.

Each zone has a unique combination of the inductance levels (i.e. also of the reluctance levels) in the different phases. This applies irrespective of the number of phases in the machine. For instance, a machine with four phases will have eight different zones within each reluctance cycle. This fact is utilized to sense or determine the absolute position in the reluctance cycle, so that the correct phase winding circuits can be activated for the desired operational state. That phase circuit which shall be activated within each zone is determined on the basis of curves over the measured values of the static torque $T_{measure}$ (see FIG. 3). It can be read from the curves illustrated in FIG. 1 over the torque T that for the zones 1 and 2, activation of drive voltage for phase 3 will result in driving in the forward direction, whereas driving of Phase 2 will result in driving in the reverse direction, while for zones 3 and 4, activation of drive voltage for Phase 1 results in driving in the forward direction and driving of Phase 3 results in driving in the reverse direction, and for zones 5 and 6, activation of drive voltage for Phase 2 will result in driving in the forward direction and driving of Phase 1 results in driving in the reverse direction.

Figure 2:
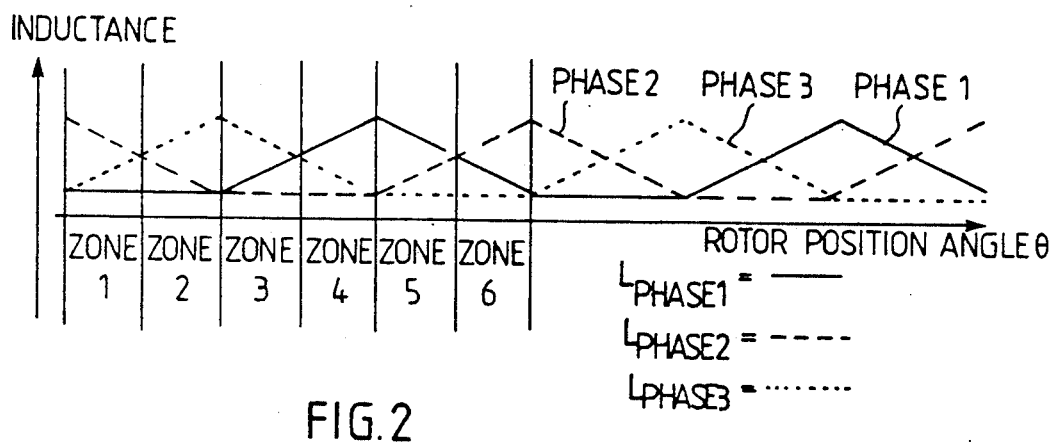
FIG. 2 illustrates schematically curves of the inductance and zone division for the three different phases in the same machine as that shown in FIG. 1, in one and the same diagram.

In the composite illustration of FIG. 2, in which the inductance Phase 1 is shown in full lines, the inductance Phase 2 is shown in broken lines, and the inductance for Phase 3 is shown in dotted lines, it is shown that it is possible to establish in which rotor position zone the rotor is located by sensing which phase has the lowest, the intermediate and the highest inductance respectively, since each zone has a unique combination of these inductance-value relationships.

Normally, it is necessary to treat the rotor positions around those zone limits in which the static torque T for a phase is zero, in a special manner. The reason for this is because there is a risk of obtaining an erroneously directed torque from that phase whose static torque T changes sign with the zone limit around these positions, due to incompleteness of the measurements. Consequently, margins or tolerances are introduced for the measurements around these positions, so as to eliminate this risk. In practice, this is done so that when the introductory comparisons indicate a given zone, further comparisons are made in order to verify the zone position. A constant value is first added to or subtracted from the measured inductance value of one of the phases which constitutes the one zone boundary or limit, whereafter the introductory comparisons are repeated. If the comparisons indicate another zone, the rotor is located close to a zone limit. There is then selected the zone whose phase combination will positively provide a drive torque in the desired direction. If the comparisons indicate the same zone as earlier, similar comparisons are made for the phases of the other zone, in order to ascertain whether or not the rotor stands close to this zone limit.

Figure 3:
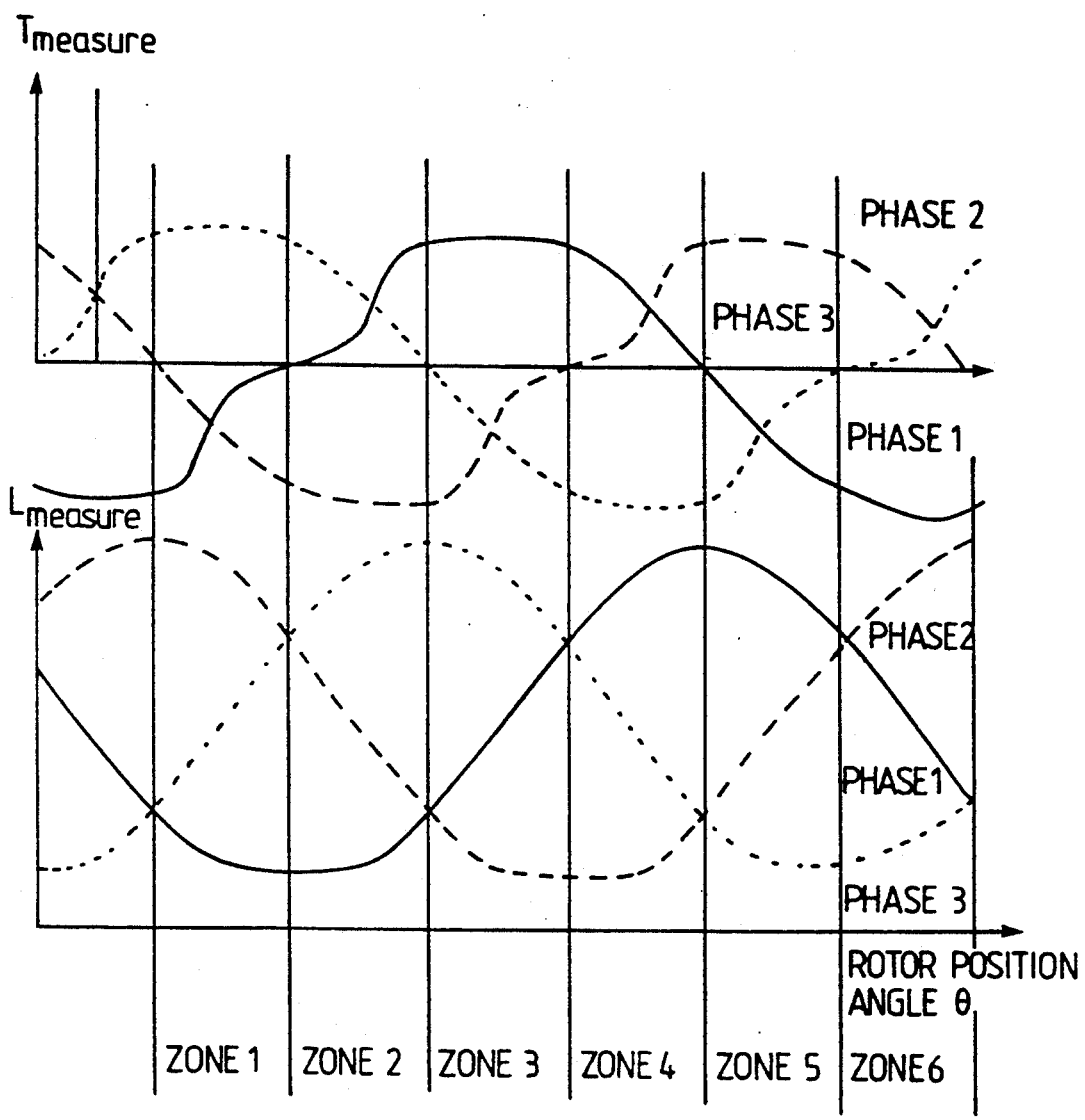
FIG. 3 illustrates diagrams of measured curves over true static torque and true inductance of a manufactured 3-phase SR-motor of a kind for which the invention is intended.

In machines which have more than three phase circuits, it can suffice to measure the inductance in solely three of the phase circuits, in order to achieve a reliable start, when requirements are not especially high. In this case, however, the maximum torque is not obtained in all positions, due to the inferior resolution resulting from such simplification. The diagram in FIGS. 1 and 2 is a principle diagram. The diagram in FIG. 3 is a true measurement diagram. It will be seen here that $T_{measure}$ has a shape which deviates from the ideal shape, although activation of the aforedescribed phases on the basis of obtained zones results in the intended driving direction. In the aforegoing, solely activation of driving only one of the phases has been described, although it will be obvious that all phases which result in driving in the desired direction can be activated simultaneously, e.g. simultaneous activation of both Phases 1 and 3 when zone 2 is indicated.

Since the reluctance is inversely proportional to the inductance, the measurement values of the reluctance can, of course, be used instead of the measurement values of the inductance. Other magnitudes which have a clear relationship with the reluctance may, of course, also be used.

Figure 4:
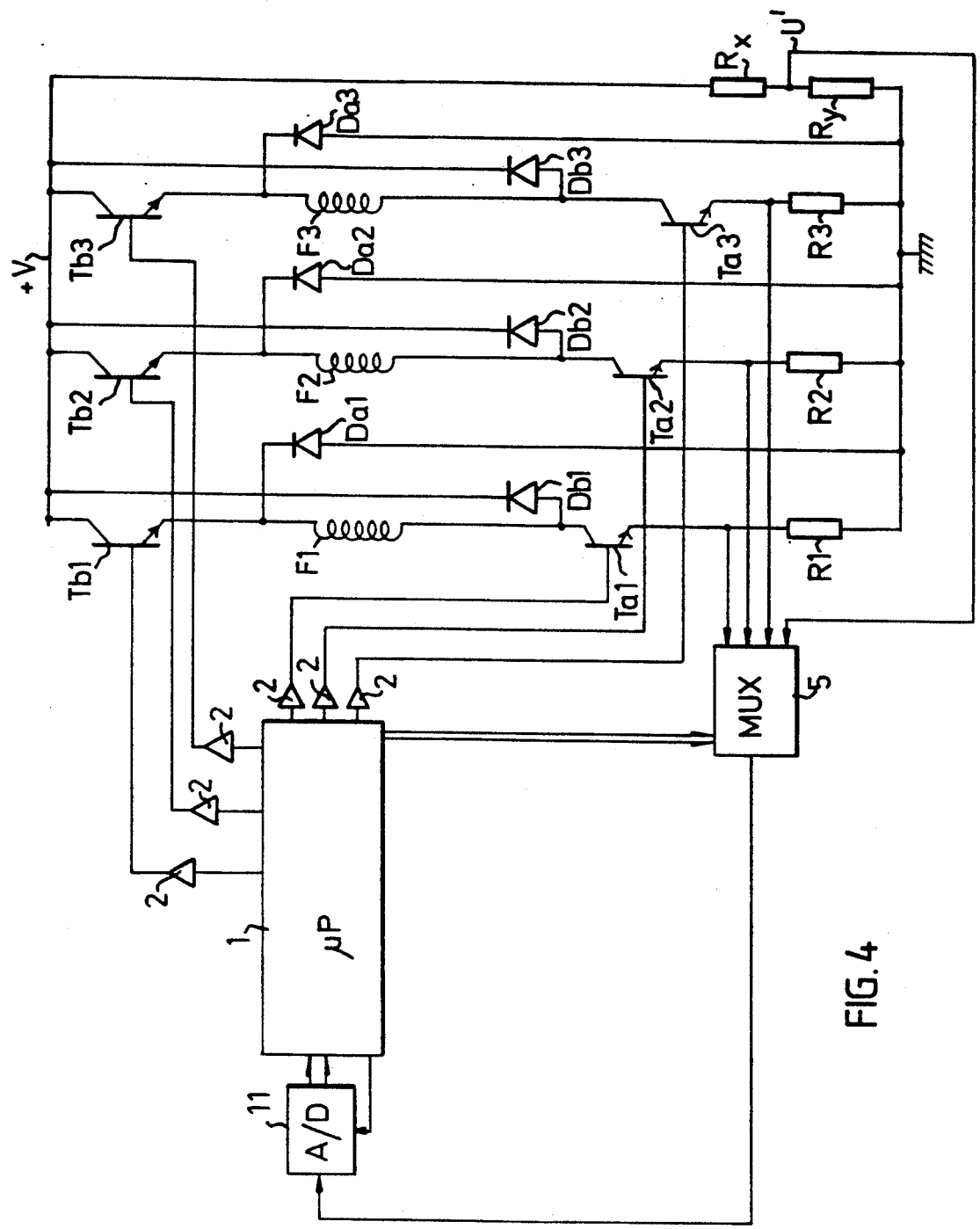
FIG. 4 illustrates an embodiment of control means for a reluctance motor for carrying out the method according to the invention.

FIG. 4 illustrates an embodiment of a circuit which can be used for carrying out the inventive method. This circuit is the same as that illustrated in U.S. Pat. No. 4,868,478 (corresponding to SE 8604308-0) with the same applicant as that of the present invention. The difference between the circuit used in the present invention and the circuit described in the aforesaid U.S. Pat. No. lies in the software in the microprocessor incorporated in the circuit, this microprocessor carrying out the aforesaid comparisons. Since the invention is used at the moment of starting with the intention of determining the rotational angular position of the motor, no winding will have voltage supplied thereto. The microprocessor will successively feed pulses to each winding whose inductance is to be determined in the manner described in U.S. Pat. No. 4,868,478 and makes the comparison on the inductance values obtained with the successive measuring processes.

FIG. 4 illustrates three phase windings F1, F2 and F3 of the stator of a three-phase reluctance motor. The invention is not limited to the number of phases of the motor. The motor is driven by a d.c. voltage +V. The phase winding F1 lies between the zero point and the plus pole of the voltage source, in a circuit which includes a current measuring resistor R1, the emitter-collector-path of a power transistor Ta1, the phase winding F1 and a power transistor Tb1.

The lower transistor Ta1 in the circuit is controlled to saturation during the whole of the period in which the phase winding F1 shall be driven, while the upper transistor Tb1 is pulsed during the drive interval of the phase in the manner conventional with switched reluctance motors, where each drive pulse for a phase is divided into part pulses. Since driving of the motor does not form any part of the actual invention, it will not be described in detail here.

The anode of a diode Da1 is connected to the zero point and the cathode of the diode is connected to that part Of the phase winding F1 remote from the transistor Ta1, so as to maintain the current through the phase winding F1 over the whole of the drive pulse interval. The anode of a diode Db1 is connected to that part of the phase winding F1 remote from the transistor Tb1 and the cathode of said diode is connected to the plus pole in order to provide a current circuit in which current is rapidly led away in the phase winding F1 as soon as the transistor Ta1 is disconnected, i.e. blocking.

Each of the remaining phase windings F2 and F3 is incorporated in a respective circuit of the same kind. Thus, the phase winding F2 is connected to a circuit comprising a current measuring resistor R2, two power transistors Ta2 and Tb2 and two diodes Da2 and Db2. The phase winding F3 is connected in a circuit comprising a current measuring resistor R3, two power transistors Ta3 and Tb3 and two diodes Da3 and Db3.

A control unit 1 in the form of a microprocessor controls the switching on and off of the transistors. The control unit 1 has six outputs, each of which is connected via a respective amplifier 2 to the base pin on a respective one of the transistors Ta1, Ta2, Ta3, Tb1, Tb2, Tb3, for the purpose of controlling each transistor individually.

The inductance level is sensed successively in each phase to be investigated, i.e. all the phases in a three phase arrangement. This is carried out in the aforesaid manner in order to detect which phase has the highest inductance value, which phase has the intermediate inductance value and which phase is the lowest inductance value, which provides an indication of the zone in which the rotor position angle $\theta$ is located (see FIG. 2).

Since the rotor is stationary and no phase has drive current, pulses of short duration are delivered from the control unit to the controls on both power transistors Tai and Tbi in the drive circuit for the winding Fi in the phase Phase i to be investigated. Each pulse has a determined duration which is small in relation to the period time, so that the current in the monitored winding is able to go down to zero between each pulse. At the end of each pulse, the current is measured by an analog/digital converter 11 connected to an input on the control unit 1. The current rise during the duration T of each pulse provides a measurement of the instantaneous inductance level in the monitored winding. Accordingly, a multiplex unit 5 has three inputs, each connected to a respective resistor R1, R2 and R3, all of which have mutually the same resistance.

The multiplex unit 5 also has a fourth input, which is connected to a voltage divider with the resistors Rx and Ry connected between the supply voltage +V and earth. The voltage U' across the resistor Ry is proportional to the supply voltage +V. As disclosed in U.S. Pat. No. 4,520,302 and U.S. Pat. No. 4,868,478, the supply voltage can vary, partly due to normal voltage variations and partly due to the voltage ripple which occurs in those instances when +V is a rectified alternating voltage, and consequently it may be suitable to investigate the value of the drive voltage after each value of the voltage across one of the resistors R1, R2 or R3, in order to obtain the correct value of the inductance, since the inductance is calculated by approximating the equation $$(U-Ri)=d(L^*i)/dt$$

which describes the voltage-current relationship for a coil having the resistance R, the inductance L, the current throughflow i and the applied voltage U with $$U=L^*di/dt$$

which in the case of a motor winding is a good approximation for small currents i and low motor speeds, i.e. small dL/dt. it is also assumed that $$di/dt=(i_2-i_1)/(t_2-t_1) \tag{1}$$

where $i_2$ designates the current at $t_2$ and $i_1$ designates the current at $t_1$ for short periods $T=(t_2-t_1)$. In this case, $i_1=0$ and $i_2$ is the current level at the end of the pulse delivered to the monitored phase winding. The voltage U is corresponded by the drive voltage +V. The inductance is thus calculated as:

$$L=V/(i_2/T)=V^*T/i_2$$

The risk of voltage fluctuations at precisely the time of making the investigation at the start moment is relatively small, and consequently it may be unnecessary for the invention to investigate the voltage over Ry for each phase investigated. There is no disadvantage, however, in carrying out the additional investigation of U', which after all is proportional to +V, and when using, at the same time, the control facility described in U.S. Pat. No. 4,868,478, it may result in simpler software, since this additional investigation shall nevertheless be carried out when the machine has started, and consequently both of the cases with and without an additional investigation of U' can be used.

The multiplex unit 5 is controlled by the control unit 1 with a digital signal, so as to indicate which of the inputs of said multiplex unit 5 shall be connected to its output. The signal from the unit 5 is supplied to the A/D-converter 11. The control unit 1 controls pulses to the phases in sequence and, for each phase, controls the multiplex unit 5 and the analog/digital unit 11 so that the voltage across the phase resistor Ri in the phase i just investigated via the multiplex unit 5 is delivered to the analog/digital converter 11 at the time T after pulse start in the phase in question. The unit 1 reads the digital signal on the output of the converter 11 and divides the signal with the resistance of the resistor Ri, so as to obtain the value of the phase current i and calculates the inductance according to the aforegiven equation (1). Subsequent to completion of a pulse control cycle including calculation of the inductance in all phases investigated, the unit 1 investigates the mutual order of magnitude of the inductance values and delivers drive voltage to the phase which provides torque in the desired direction in accordance with a stored preference program and also carries out those calculations described above with reference to FIGS. 1–3. No flow diagram is given for these calculations, since it is extremely simple for an ordinary programner to compile a program with the aid of the information given above.

It will be understood that many modifications are possible within the scope of the invention.

What is claimed is:

1. A method for starting an electric variable reluctance machine of a kind having three or more phase circuits (Phase 1, Phase 2, Phase 3, F1, F2, F3) with varying reluctance in dependence on the position of a movable part, made of soft magnetic material, in relation to a stationary part of the machine, the method comprising the steps of:
dividing a reluctance cycle of the machine into a number of rotor position angular zones (zone 1—zone 6), where there is a clear relationship between said phase circuit values within each zone;

defining rotor position angular zone boundaries as zone positions in which two phases have equally large phase circuit values;

determining said phase circuit values ($L_{PHASE1}$, $L_{PHASE2}$, $L_{PHASE3}$) which are relevant among said phase circuits (F1, F2, F3);

establishing by comparison a mutual order of magnitude of the determined values, and therewith establishing the zone which discloses the position of the movable part in relation to the stationary part; and activating at least one circuit (F1, F2, F3) which produces driving in the desired direction, based on the established zone.

2. A method according to claim 1, wherein
said phase circuit values ($L_{PHASE1}$, $L_{PHASE2}$, $L_{PHASE3}$) in all of said phase circuits (F1, F2, F3) are determined.

3. A method according to claim 1, wherein the
rotor position angular zone in which the rotor is located is established by determining which phase circuit (F1, F2, F3) has a lowest phase circuit value ($L_{PHASE1}$, $L_{PHASE2}$, $L_{PHASE3}$), which phase circuit (F1, F2, F3) has an intermediate phase circuit value ($L_{PHASE1}$, $L_{PHASE2}$, $L_{PHASE3}$), and which phase circuit (F1, F2, F3) has a highest phase circuit value ($L_{PHASE1}$, $L_{PHASE2}$, $L_{PHASE3}$), respectively.

4. A method according to claim 1, wherein
a further comparison is made between said values, subsequent to establishing said zone, in order to verify the established zone and to detect whether the zone position is located close to one of the limits of said zone, by adding or subtracting the phase circuit values which have been determined to be relevant with a constant value prior to said further comparison, for those phase circuits which determine the zone limits.

5. An arrangement for starting an electrical variable reluctance machine of a kind having at least three phase circuits with varying reluctance in dependence on a position of a movable part, made of soft magnetic material, in relation to a stationary part of the machine, so as to enable selection of at least one phase circuit which shall be activated in order to provide torque in a desired direction, said arrangement comprising a calculating and control unit (1) which is connected to control means (Ta1, Tb1; Ta2, Tb2; Ta3, Tb3) for the different phase circuits and which is connected to detect phase circuit values having a clear relationship with reluctance values of the machine, wherein a reluctance cycle of the machine is divided into a number of rotor position angle zones where a clear relationship between said phase circuit values is found within each zone;

said calculating and control unit (1) functions to
in sequence, determine values for relevant phase circuits, thereby determining at least three phase circuit values, among said phase circuits, and thereafter functions to establish a mutual order of magnitude between said determined values, and functions to define rotor position angular zone boundaries as zone positions in which two phases have equally large phase circuit values;

and functions to establish the rotor position zone within which said movable part of the machine is located in relation to said stationary part; and wherein said calculating and control unit (1), on the basis of the established rotor position zone and a position between the movable part of the machine in relation to the stationary part thereof indicated by said established zone, activates at least one phase circuit which provides driving in a desired direction.

6. An arrangement according to claim 5, wherein
the calculating and control unit (1) is connected to detect, via a controllable multiplex unit (5), a value which is proportional to a current in each of the phase circuits, wherein the calculating and control unit (1) is arranged to investigate the inductance in each phase circuit in sequence, by activating a phase circuit over a predetermined time period and to determine a value of a current of the phase circuit at the end of the activation time.

7. An arrangement according to claim 5,
wherein the calculating and control unit (1) is arranged to establish which rotor position angular zone the rotor is located in by determining which phase circuit (F1, F2, F3) has a lowest phase circuit value ($L_{PHASE1}$, $L_{PHASE2}$, $L_{PHASE3}$), which phase circuit (F1, F2, F3) has an intermediate phase circuit value ($L_{PHASE1}$, $L_{PHASE2}$, $L_{PHASE3}$), and which phase circuit (F1, F2, F3) has a highest phase circuit value ($L_{PHASE1}$, $L_{PHASE2}$, $L_{PHASE3}$), respectively.

8. An arrangement according to claim 5,
wherein the calculating and control unit (1) is arranged to calculate an inductance L in each phase circuit with the aid of an equation $L = V*T/i_2$, where V is a phase drive voltage, T is a predetermined duration and $i_2$ is the current detected at the end of the activation time.

9. An arrangement according to claim 5,
wherein said calculating and control unit (1), subsequent to establishing said zone, is arranged to carry out a further comparison between said phase circuit values in order to verify the established zone and with an incorporated logic operation determine whether the zone is located close to one of the limits of said zone, by, for those phase circuits which determine the zone limits, adding or subtracting the phase circuit values which have been determined to be relevant with a constant value prior to said further comparison.

* * * * *